US010641242B2

(12) United States Patent
Ehrnberg

(10) Patent No.: US 10,641,242 B2
(45) Date of Patent: *May 5, 2020

(54) OFFSHORE ENERGY STORAGE DEVICE

(71) Applicant: Sea Twirl AB, Gothenburg (SE)

(72) Inventor: Daniel Ehrnberg, Gothenburg (SE)

(73) Assignee: SEA TWIRL AB, Göteborg (SE)

( * ) Notice: Subject to any disclaimer, the term of this patent is extended or adjusted under 35 U.S.C. 154(b) by 245 days.

This patent is subject to a terminal disclaimer.

(21) Appl. No.: 15/827,079

(22) Filed: Nov. 30, 2017

(65) Prior Publication Data
US 2018/0087487 A1    Mar. 29, 2018

Related U.S. Application Data

(63) Continuation of application No. 14/831,793, filed on Aug. 20, 2015, now Pat. No. 9,856,852, which is a
(Continued)

(30) Foreign Application Priority Data

Jul. 17, 2009    (SE) ...................... 0900995

(51) Int. Cl.
| F03D 3/00 | (2006.01) |
| F03G 3/08 | (2006.01) |
| H02K 7/02 | (2006.01) |
| H02K 7/18 | (2006.01) |
(Continued)

(52) U.S. Cl.
CPC ............... F03D 3/005 (2013.01); F03D 9/10 (2016.05); F03D 9/12 (2016.05); F03D 9/25 (2016.05);
(Continued)

(58) Field of Classification Search
CPC ..... F03D 9/28; F03D 9/25; F03D 9/10; F03D 9/12; F03D 13/25; F03D 3/005;
(Continued)

(56) References Cited

U.S. PATENT DOCUMENTS 7,075,189 B2 * 7/2006 Heronemus ............. B63B 1/047
290/44
7,156,037 B2 * 1/2007 Borgen ................... E02D 27/42
114/264
(Continued)

FOREIGN PATENT DOCUMENTS

| DE | 10102023 | 7/2002 |
| DE | 20206234 | 8/2002 |
(Continued)

OTHER PUBLICATIONS

European Search Report for counterpart EPO Application No. 10800110.8; dated Apr. 25, 2017, European Patent Office, Munich DE.

*Primary Examiner* — Dwayne J White
*Assistant Examiner* — Adam W Brown
(74) *Attorney, Agent, or Firm* — Babcock IP, PLLC

(57) ABSTRACT

The present invention relates to a floating wind energy harvesting apparatus for offshore installation, the wind energy harvesting apparatus comprising: an elongated wind turbine body extending along a longitudinal wind turbine body axis, the wind turbine body comprising a lower body portion to be below a water surface when the wind energy harvesting apparatus is in operation and an upper body portion to be above the water surface when the wind energy harvesting apparatus is in operation; wind turbine blades attached to the upper body portion for converting wind energy to rotation of the wind turbine body around the longitudinal wind turbine body axis; an energy converter attached to the wind turbine body for converting the rotation of the wind turbine body in relation to a non-rotatable part to electrical energy; and anchorage means connecting the non-rotatable part to at least one anchor point via at least one float body.

15 Claims, 8 Drawing Sheets

Related U.S. Application Data continuation of application No. 13/384,408, filed as application No. PCT/SE2010/000195 on Jul. 16, 2010, now abandoned.

(51) Int. Cl.
   *F03D 13/25* (2016.01)
   *F03D 9/25* (2016.01)
   *F03D 9/28* (2016.01)
   *F03D 9/10* (2016.01)
   *F03D 9/12* (2016.01)

(52) U.S. Cl.
   CPC .............. *F03D 9/28* (2016.05); *F03D 13/25* (2016.05); *F03G 3/08* (2013.01); *H02K 7/025* (2013.01); *H02K 7/1853* (2013.01); *F05B 2240/93* (2013.01); *F05B 2240/95* (2013.01); *Y02E 10/725* (2013.01); *Y02E 10/727* (2013.01); *Y02E 60/16* (2013.01); *Y10T 74/2119* (2015.01)

(58) Field of Classification Search
   CPC ........ H02K 7/1853; H02K 7/025; F03G 3/08; Y02E 10/727; Y02E 60/16; F05B 2240/93
   See application file for complete search history.

(56) References Cited

U.S. PATENT DOCUMENTS

| | | | | |
|---|---|---|---|---|
| 7,293,960 B2* | 11/2007 | Yamamoto | ................ | F03D 1/02 416/85 |
| 7,397,144 B1* | 7/2008 | Brostmeyer | ............ | F03B 13/20 290/53 |
| 7,508,088 B2* | 3/2009 | Kothnur | .................. | F03D 13/22 290/43 |
| 7,612,462 B2* | 11/2009 | Viterna | ................... | B63B 21/50 290/42 |
| 7,750,492 B1* | 7/2010 | Ryznic | ................... | F03D 3/005 290/43 |
| 8,057,127 B2* | 11/2011 | Lopez | ..................... | F03D 13/10 405/224 |
| 8,118,538 B2* | 2/2012 | Pao | ......................... | B63B 21/50 415/115 |
| 8,471,396 B2* | 6/2013 | Roddier | .................. | B63B 35/44 290/44 |
| 2005/0169742 A1 | 8/2005 | Kane | | |

FOREIGN PATENT DOCUMENTS

| | | |
|---|---|---|
| NL | 1035026 C2 | 8/2009 |
| WO | 03016714 | 2/2003 |

\* cited by examiner

OFFSHORE ENERGY STORAGE DEVICE

BACKGROUND

1. Technical Field

The present invention relates to an offshore energy storage device, storing energy as rotational kinetic energy, comprising an elongate, upright central part, which is rotatable around its longitudinal axis, floating means arranged to keep it upright and floating, a fly wheel arranged concentrically around the central part and anchorage means below the fly wheel for anchoring to the sea bed.

2. Background Art

Motions in air and water are a concentrated form of renewable energy resources that hold great opportunities to provide energy in an environmentally friendly way. And humans have used these resources for thousands of years. The energy has partly been absorbed and converted by vertical axis power plants, meaning that the part of the power plant that absorbs the energy is located on an axis that is vertically directed, and partly by horizontal axis power plants, meaning that the part of the power plant that absorbs the energy is located on an axis that is horizontally directed.

However the usage of power plants to absorb motions in air and water has been limited, especially in oceans with depths over 50 meters. These areas hold large quantities of energy that is bound in motions but it has been very expensive to install power plants on these locations and large foundations or attachments to the ground have often been used.

A previous power plant that has solved some of these problems is the patent application EP1106825A, which comprises an aggregate to absorb motions in the air where a float body is used to install a wind-power station on top of it. U.S. Pat. No. 4,775,340 is also a similar example of this; here is the floating frame, that the wind-power station is placed on, round in the horizontal plane.

But the power stations must also be stable since water and air flow can vary quickly. A good solution to this is described in the patent US2006269396, where a floating wind-power station floats in a vertical position so that the centre of mass of the power plant is located under the centre of the buoyancy. That power plant is trying to get a good stability through a vertical extent while the U.S. Pat. No. 7,397,144B1 instead discloses a horizontal extent, which makes it possible to build a very large and heavy rotor with no bearings. This U.S. Pat. No. 7,397,144B1, describes an aggregate to absorb the motions in the air where both float body and rotor together rotate as a floating body on the water.

The U.S. Pat. No. 7,397,144B1 discloses a vertical axis power plant, but unlike the previously mentioned power plants, it uses a rotating surface based float body with a horizontal extent. To rotate the body which has a large extent horizontally means, however, that friction will increase because of the higher speed on the outer parts of the float body. The horizontal extent also means that strong forces are acting thereon in stormy weather and large waves, since the surface towards the waves are large, which in turn makes high demands on anchorage and the ability to withstand very large forces. The remaining problems for the device disclosed in U.S. Pat. No. 7,397,144B1 and the previous technologies are still stability and, as a result of this, also anchoring.

Another major problem for renewable energy resources is also that they usually do not have a continuous out-effect, for example, it varies due to wind variations. Being able to store energy in a suitable and cost efficient way is still a major problem. The power plants mentioned above may therefore be positioned at locations with a relatively stable climate, and in combination with other energy systems, for example hydropower, so that a consumer of energy can get a reliable, continuous delivery of energy, even if there is, for example, no wind.

Even if we make use of for example the storage capability of hydro power there is a limit to how many power plants mentioned above that can be incorporated in an energy system. This is one of the reasons for starting to explore different solutions, such as the present invention.

SUMMARY OF THE INVENTION

The present invention relates to an aggregate to store energy as kinetic energy. The aggregate comprises a float body intended to be placed, at least partially, rotating in a fluid. The present invention relates to this aggregate as well as the use of such aggregates.

The present invention uses, in fact one of the earlier overlooked physical effect in power plants, the conservation of angular momentum. By rotating a relative heavy object around an axis, the object will resist to changes in its orientation. This is used by the present invention to create stability but also to be able to store energy like in a flywheel.

Another, maybe even more important, solution in the present invention is the use of inertia and the weight of the surrounding water that stabilizes the aggregate when it rotates with a vertical extent down in the depth of the water. This stable and rotating platform can be supplied with energy through a conversion means, for example a generator and motor, or by wind or water blades that absorbs the energy from the moving air or water. In this way the present invention can work as a reservoir for example the above mentioned aggregate in U.S. Pat. No. 7,397,144B1 or other power plants.

Another invention that converts wave motions of the ocean is described in international patent application WO2008038055 and uses two floating cylinders which are driven by the wave motions. The present invention, however, does not receive its rotation from wave motions and does not consist of two floating bodies and these are not situated at the surface of the ocean, which makes it impossible for the surrounding water to stabilize as in the present invention.

The present invention can incorporate a section that absorbs wind as a vertical wind-power plant. In this way the section that absorbs the energy when it blows can also store this energy as kinetic rotation energy in all the rotating parts of the aggregate. When the wind has stopped blowing, the aggregate or maybe just parts of the aggregate could continue to spin even though the parts that absorb the energy have stalled. This means that the conversion means of the invention, for example a generator can generate energy even when it no longer blows.

By these aspects the present invention differs significantly from previously known technologies and by distinguishing in this way, power plants can be developed for e.g. storing energy, creating a smaller surface against the waves and thereby resisting storms better, handling variations in wind or water flow by having better stability and also be used by existing energy producing power plants to store energy in the form of rotation and to provide a better stability in energy systems. In the last case, for example, a generator could be used reversed as an electrical motor where the energy will be converted from electricity to kinetic energy, and later be converted back to electric energy when needed.

Storing energy in rotation through flywheels has been known for a long time, but the units that have been built have often used complicated constructions and technology where the rotor is suspended by bearings or magnetic fields and where the rotor often rotates in a vacuum to decrease the friction. Instead of building complex units with a rapidly rotating rotor, large and simple units will built, using natural components such as the surrounding water as a bearing.

A first object of the present invention is to provide an aggregate that can store energy as kinetic energy. In this way, energy systems connected to the aggregate can be more stable and the aggregate can work as energy reservoir, even for other power plants that transports its energy to the aggregate for storage. The energy production of the power plants will benefit significantly through storage of energy, since the energy that is produced when demand is low and there are high winds also can be used if stored.

A second object of the present invention is to provide an aggregate that extracts energy from the movement of air and water in a cost efficient way. This is partly done by building a very large power plant and partly by using relatively cheap material in the construction, since weight is not as limiting a factor as in previous techniques.

A third object of the present invention is to provide an aggregate with as few moving parts as possible, to minimize the risks of damage under severe weather conditions, for example.

A fourth object of the present invention is to provide a stable aggregate which efficiently can handle the variations in air and water flow.

A fifth object of the present invention is to provide an aggregate which is easy to install and which also becomes mobile after the installation.

A sixth object of the present invention is to be able to store energy in surrounding water in the form of kinetic energy.

At least one of the above objects is obtained according to claim 1.

Consequently, the invention relates to an aggregate for storing energy in the form of motion.

The said aggregate comprises a float body and conversion means, whereby the said floating body is at least partially or completely placed in a fluid and is arranged to rotate in direct contact with said fluid and that said floating body together with said surrounding fluid is used by the aggregate to store energy in the form of motion, and whereby energy is added to or extracted from the floating body and surrounding fluid through either said conversion means or via a part that absorbs energy of movements in a fluid and which the aggregate further could comprise, or that the energy is supplied or extracted from the float body and the surrounding liquid by a combination of these.

By constructing an aggregate according to the invention, energy can be stored in the form of kinetic energy. The aggregate may comprise a part that absorbs the energy and in this way e.g. a sea based wind-power station which can store energy can be constructed without the usage of ball bearings. In this case a floating body replaces the ball bearings and handles the forces with the aid of the surrounding water, which is usually performed by bearings in power plants and flywheels. By constructing an aggregate according to the invention, the floating body can be used as an energy reservoir both for a short time and for a long time. A possible wind-power station can then directly transfer its energy to the floating body in the form of motions. This energy is stored by rotation of the floating body and also a larger volume of the surrounding water can be used to store energy in. When using for example the surrounding water to store energy, is it rotating along with the floating body and in this way a large amount of mass is put into motion. The conversion means can for example consist of an electric generator and be used to convert kinetic energy to electricity.

In one embodiment of the aggregate according to the invention, said floating body is interconnected to a part that absorbs the energy whereby said floating body sometimes is allowed to rotate even if said part rotates with a lower speed or has stalled relative to said floating body.

In one embodiment of the aggregate according to the invention, said floating body is interconnected to said part which comprises a vertical axis power plant to absorb the energy in motions of a fluid.

In one embodiment of the aggregate according to the invention, said floating body is interconnected to said part which comprises a horizontal power plant to absorb the energy in motions of a fluid.

In one embodiment of the aggregate according to the invention said fluid is comprised by a gas or a liquid.

In one embodiment of the aggregate according to the invention said part is comprised by an outer torus-shaped ring which surrounds the part that absorbs the energy and focus on the motion of the fluid through the part that absorbs the energy.

In one embodiment of the aggregate according to the invention said floating body gives at least partially buoyancy to the aggregate in a liquid.

In one embodiment of the aggregate according to the invention, said floating body can increase its ability to store energy in form of motions by moving a mass from a more rotationally centralized cavity into a less rotationally centralized cavity or by the float body increasing its ability to store energy by increasing its mass and fill its cavities with for example surrounding liquid or a combination of those.

In one embodiment of the aggregate according to the invention, the floating body is also arranged to use surrounding said liquid to store energy in the form of motion, whereby the float body is equipped with fins, blades or other types of surfaces to increase its contact to surrounding liquid.

In one embodiment of the aggregate according to the invention, the floating body is further arranged to use surrounding said liquid to store energy in form of motions whereby structures or walls can be raised in the surrounding of aggregate to either restrict or control the motions of surrounding liquids that is used to store energy or to limit other flows, streams, motions or other possible effects.

In one embodiment of the aggregate according to the invention, the said aggregate further comprises anchorage means adapted to connect said aggregate with at least one anchor point.

In one embodiment of the aggregate according to the invention the said anchorage means is meant to connect said aggregate with a base which at least partially delimits said liquid.

In one embodiment of the aggregate according to the invention the said anchorage means is meant to provide said aggregate with a non-rotatable point interconnected with said conversion means via a second part.

A second aspect of the invention relates the use of an aggregate to store energy in form of motions or to extract energy from motions of a fluid.

Problem Structure

The object of the present invention is mainly to provide an energy storage device which overcomes the problems associated with offshore energy storage devices according to the prior art.

Solution

The objects forming the basis of the present invention will be attained if the bracket intimated by way of introduction is characterised in that the upper end of the central part is freely movable.

BRIEF DESCRIPTION OF THE ACCOMPANYING DRAWINGS

The present invention will be explained below by means of non-limiting examples with reference to the accompanying drawings, in which.

DETAILED DESCRIPTION OF THE PREFERRED EMBODIMENTS

The invention will be described by means of examples of embodiments. It should nevertheless be understood that these embodiments only serve as to elucidate the present invention, the extent of protection of which is limited by the following claims.

Figure 1:
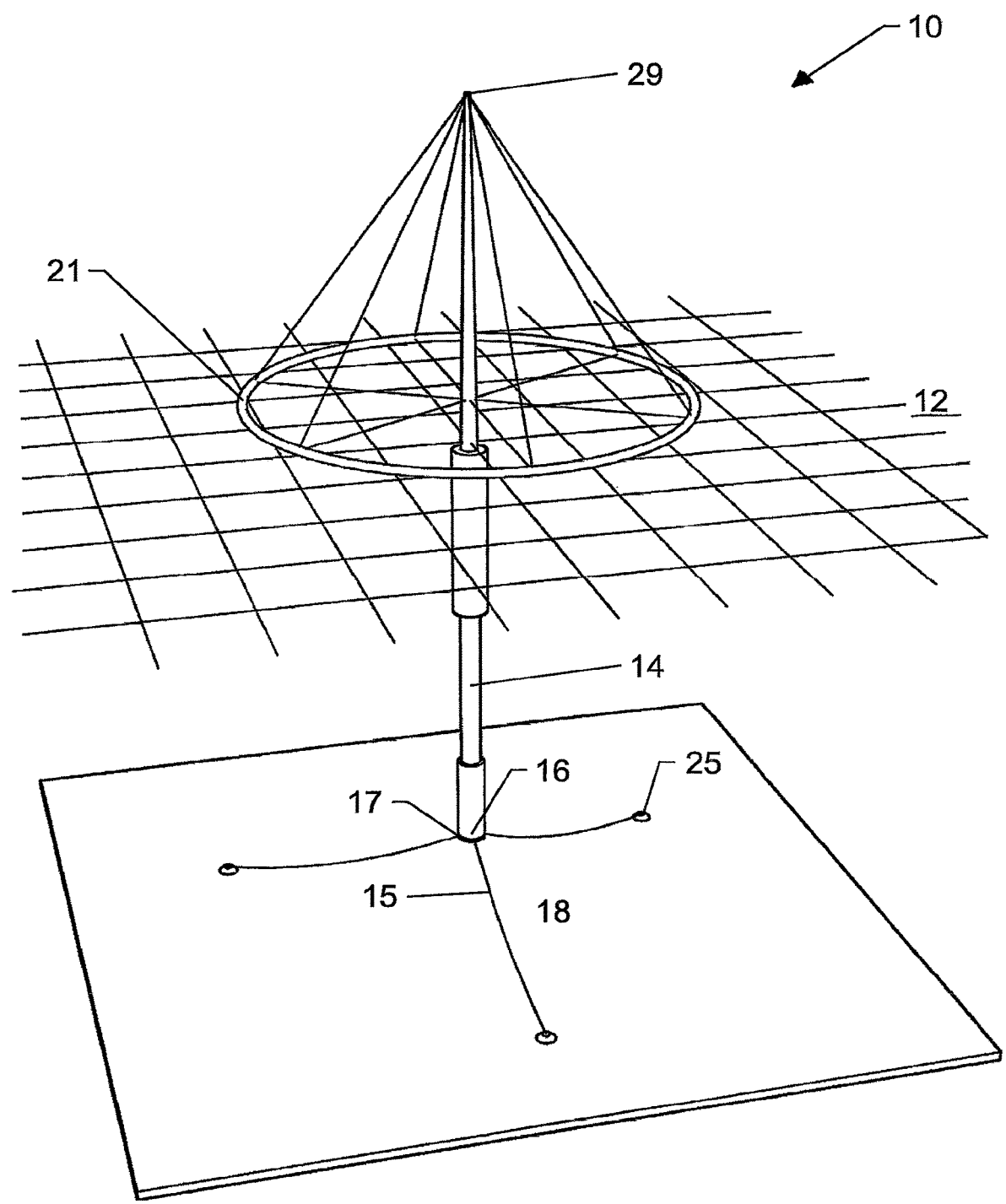
FIG. 1 shows a schematic, perspective view of an embodiment of the aggregate which stores energy in form of motions.

FIG. 1 schematically shows the aggregate 10 intended to store energy in form of motions. The aggregate 10 comprises a floating body 14 and a conversion means 16. The floating body 14 is arranged to rotate in direct contact with the surrounding liquid 12, i.e. the sea water, and it is in this embodiment used for storing energy in form of rotation, whereby energy is supplied to floating body 14 by the conversion means 16, which will convert mechanical energy into electric energy and vice versa. In this way large amounts of energy can be stored in form of rotation. This can be especially suitable for a combination with sea based wind-power stations when the wind is strong. The energy can then be led as electricity to the conversion means 16 and be stored as kinetic energy in form of rotation of the floating body 14.

Further, there is also an opportunity to use the surrounding water to store kinetic energy generated by the motion of water masses. Also, by rotating the surrounding water around the floating body 14, even larger amounts of energy may be stored. In these cases whole electricity grids may be regulated from the aggregate 10, which will work as a large energy reservoir.

According to the invention, the aggregate 10 has an approximately vertical axis when it is in use. During use, and depending on the weather conditions, the axis may be somewhat tilted, but the construction of the aggregate, as well as its function, will ensure that the aggregate returns to its upright position, with an approximately vertical axis. The rotation of the aggregate 10 around its longitudinal axis will assist in keeping the aggregate upright. The float body 14, arranged at a distance from a lower, anchored end of the aggregate 10, will also make sure that the aggregate remains upright. The upper, free end 29 of the aggregate 10 will allow a tilting of its axis, which will allow adaptations to variations in the currents in the surrounding water. At the same time, there is no need for bearings at the upper or lower end of the aggregate 10 besides for the anchorage means 15.

In FIG. 1 an anchorage means 15 shown, adapted to connect said aggregate 10 with at least one anchorage point 25. It may also be considered to connect anchorage means 15 to a boat, rock or some other possible attachment point that may occur at sea, in lakes or in flowing streams.

The anchorage means 15 could be used to direct the aggregate 10 or parts of this in a desired direction in relation to the direction of motion of the surrounding fluid with the aid of the motion of the fluid. This could be done by, for example, moving the attachment point on the anchorage means 15 on the aggregate 10. For example, a motor or a hydraulic system could be used to move the attachment point, which could be designed in a variety of ways. As the upper end 29 is free, only the lower end of the aggregate will have to be moved.

In rough weather the aggregate 10 may be exposed to less stressful forces by directing or changing the position of the aggregate 10. FIG. 1 shows an example where the anchorage means 15 is connected to the aggregate 10 with a base 18 which at least partly restricts the liquid 12. In this example the anchorage means 15 is intended to provide said aggregate 10 with a non-rotatable point interconnected to conversion means 16 by means of a second part 17. In this case the conversion means 16 could be a generator that uses the second part 17 as a non-rotatable point and converts the relative rotation between the float body 14 and this second part 17 into electric energy. The second part 17 could be replaced with other types of anchorage means or fins so that the surrounding water 12 or the base 18 will slow down the rotation. Another option is that the aggregate 10 and anchorage means 16 are interconnected directly to a fundament at the base. The aggregate 10 is used primarily at seas, in lakes or in streaming waters but can also be used in a pool or reservoir, filled with some other liquid than water.

Figure 2:
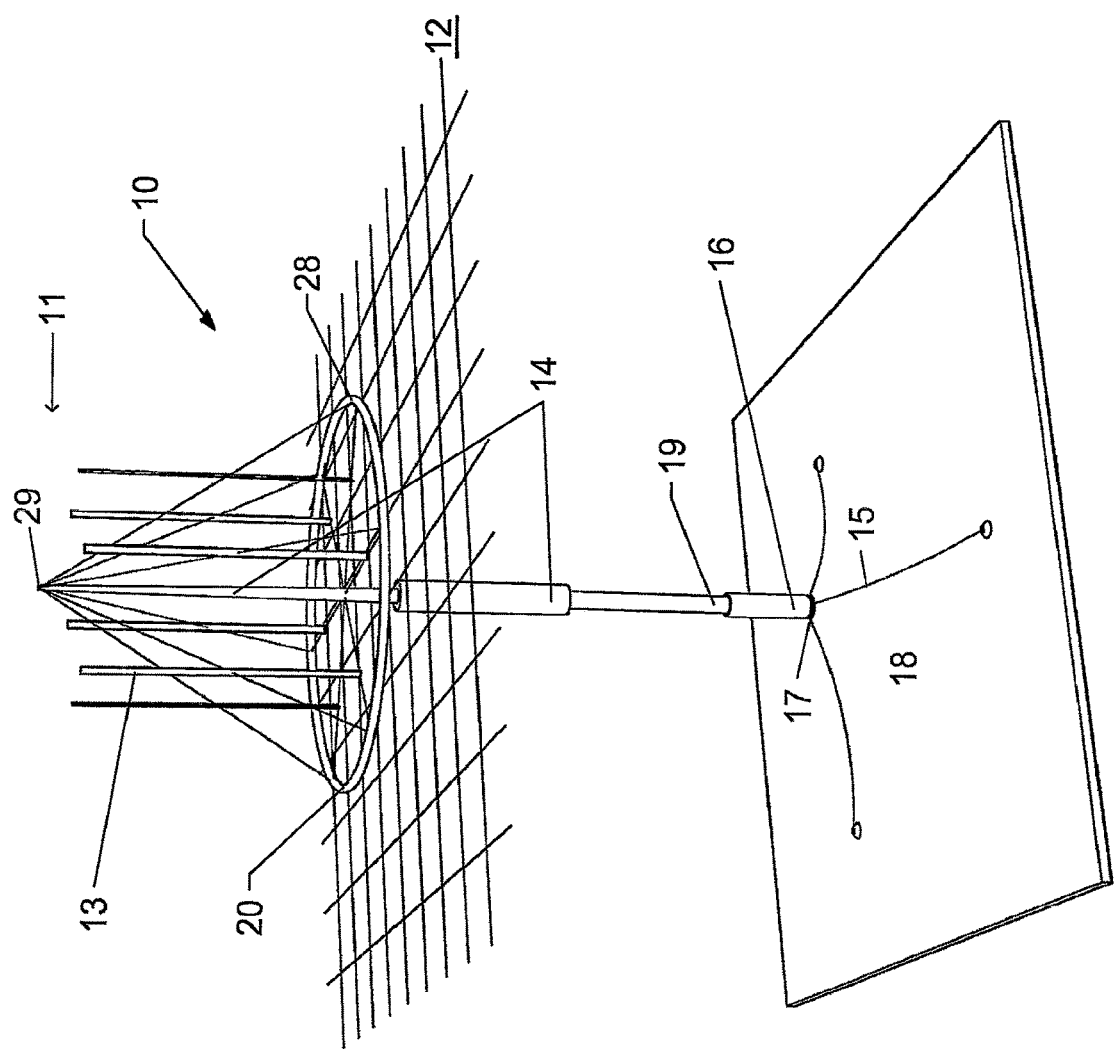
FIG. 2 shows a schematic, perspective view of another embodiment of the aggregate which stores energy in form of motions and absorbs motions of the air as a vertical axis power plant.

By letting a float body 14 rotate, the conservation of momentum and the inertia of the water will create a stable platform and also the opportunity to store large amounts of energy. This construction also creates a possibility to provide one or more energy absorbing part 13, such as a horizontal axis wind-power station as shown in the embodiment of FIG. 2. The part 13, i.e. the wind power station, or the conversion means 16 can supply or absorb energy from the float body 14 where energy is stored as kinetic energy. It should however be mentioned that the part 13 could be constructed in numerous different ways and that there are for example many different types of vertical wind turbines that could be used.

FIG. 2 shows a schematic view of the aggregate 10 to store energy in form of motions in a float body 14 where the float body 14 is interconnected with a part 13. In FIG. 2 the part 13 comprises a vertical axis wind-power station, which absorbs energy from a fluid and stores it in the rotating float body 14 as kinetic energy. Such a fluid could be a gas 11 or a liquid 12. In this case the float body 14 at least partially gives buoyancy to the aggregate 10 in the liquid 12. As mentioned above, it may also be considered using the surrounding water to store rotational energy. It can for example be done by fins on the sides of the float body 14, which makes the water rotate around the float body 14.

Another possibility is to build the float body 14 very large and it may also be considered loading certain areas in float body 14 with a liquid 12, for example. By moving a liquid or some other mass into the float body 14, the mass that holds the stored kinetic energy is altered. The alteration of the mass will, in turn, alter the rotational speed of the aggregate, when the energy remains constant. In this way, the rotational speed can be adjusted and perhaps be used for an easier start up of the rotation, to store even more energy and to keep an approximately constant rotational speed.

An example of where one or more cavities are used is seen in FIG. 2. A liquid can be pumped between two cavities with different positions; a more rotationally centralised cavity 19 one the one hand, and a less rotationally centralised cavity 20 on the other hand. It means that the float body 14 can store a larger amount of kinetic energy at the same rotational speed, when the liquid is pumped from the rotationally centralised cavity to the less rotationally centralised cavity. By the same token, the rotational speed is changed when the distribution of the mass is changed and the energy remains constant.

It should also be noted that the movement of masses could be performed in many ways, for example by means of valves, pumps, motors, moving wires etc. The centrifugal force could be used to move a mass. Another way is to simply let it fall down and make use of the difference in potential energy at a higher position and a lower position. In this way a mass could be moved between a more rotationally centralised cavity 19 and a less rotationally centralised cavity 20.

An example of an application of the invention could be to use a horizontal power plant which supplies the float body 14 with energy, which is stored as kinetic energy and the conversion means 16 can later convert this energy to electric energy when the need arises. The float body 14 is still rotating, although at a lower speed as the energy is consumed, and conversion means 16 can thereby continue to convert kinetic energy to electricity even when the wind has decreased.

An example of the aggregate 10 according to the present invention is shown in FIG. 2. It should be noted that this embodiment only serves as an example and that the included components and dimensions of these are only one of a number of possible combinations which all fall within the extent of protection of the accompanying claims.

The aggregate 10 in FIG. 2 is placed at sea and is arranged to produce and store electricity when the part 13 is included, by means of absorbing a flow of a fluid, in this case air, and to absorb this flow, i.e. the wind, through the part 13, a vertical axis wind-power station.

Figure 3:
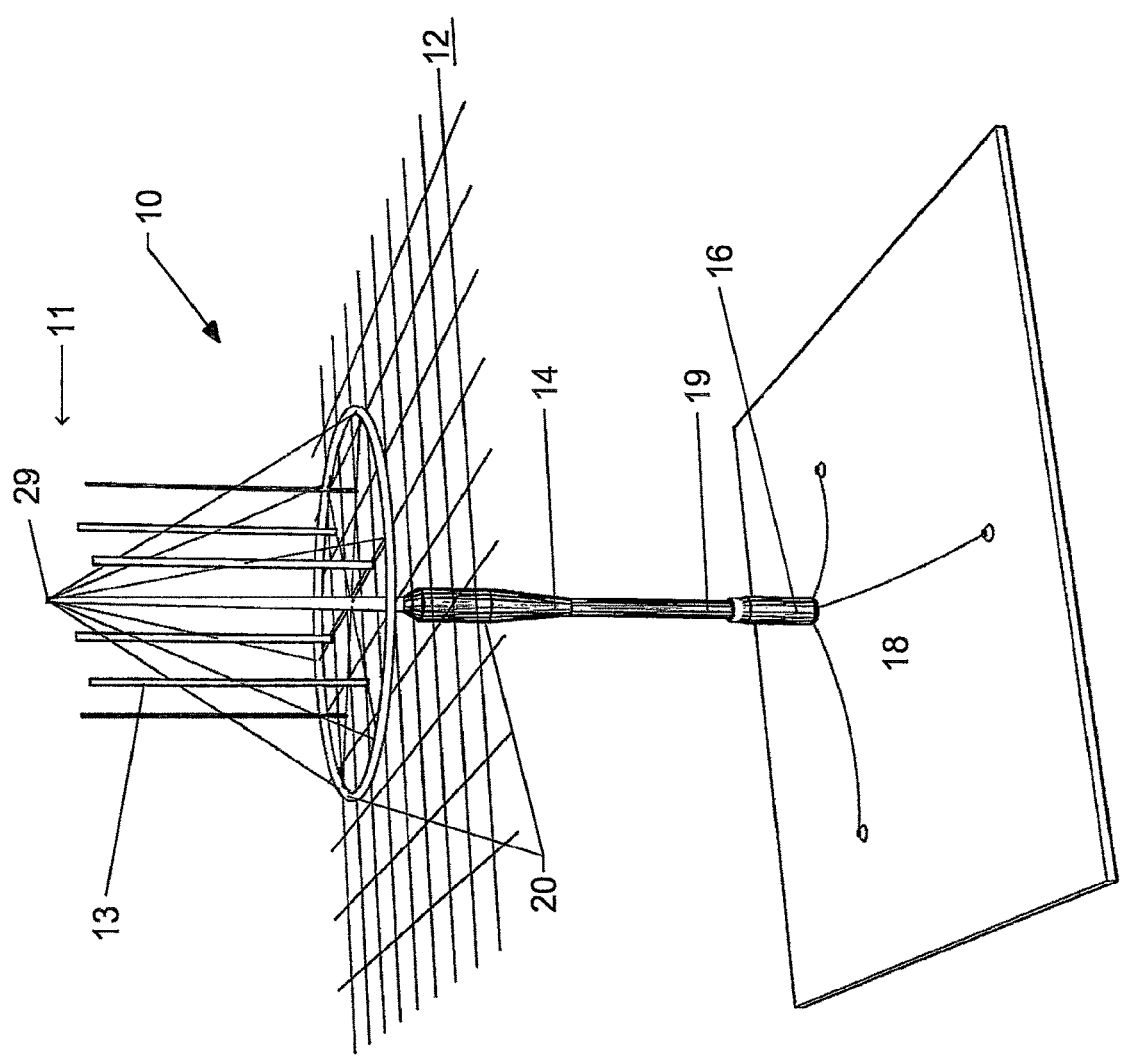
FIG. 3 shows a schematic, perspective view of a third embodiment of the aggregate which stores energy in form of motions and absorbs motions of the air as a vertical axis power plant.

Further, the float body 14 in FIG. 3 is an embodiment which may increase its ability to store energy in the form of motions by moving a mass from a more rotationally centralized cavity 19 into a less rotationally centralized cavity 20, or by letting the float body 14 increase its ability to store energy by increasing its mass and filling its cavities with, for example, the surrounding liquid 12, or a combination of these measures. The float body 14 is provided with several cavities 19, 20, which may both receive a liquid temporarily, in order to store energy. When the stored energy is to be retrieved, either or both of the cavities 19, 20 may be emptied. In this way, the amount of mass or the position of the mass that forms the base for the energy storage changes, or both, whereby the same amount of energy as before can be stored but at a different speed.

Another option is that different amounts of energy can be stored at the same rotational speed of the float body 14. This option may be used for keeping a correct phase while converting the energy to electricity through conversion means 16, relative the phase of the energy systems to which the aggregate 10 could be connected.

The float body 14 of FIG. 3 can also be arranged to use the surrounding liquid 12 in order to store energy in form of motions, whereby the float body 14 can be equipped with fins, blades or other types of surfaces to increase its contact with the surrounding liquid 12. This means that the potential for storing energy becomes very large. It could be compared with a local current in the liquid 12 which is created when the float body 14 is supplied with energy and starts to rotate together with surrounding liquid 12. This local current conserves the energy in form of rotational motion, and when the need of energy arises, the float body 14 will receive the energy and the conversion will take place for example through a conversion means 16, which in this example comprises a generator. Another possibility is that the conversion means 16 comprises a pump or that the energy is directly converted to hydrogen or oxygen or to produce fresh water through reverse osmosis. FIG. 3 shows a schematic view of the aggregate 10 to store energy in form of motions in a float body 14, where said float body 14 is interconnected with part 13, which in this embodiment is a wind power station.

The part 13 consists of a vertical wind rotor in the described embodiments, which means that the weight of the wind rotor must be carried by the float body, and that the energy that is absorbed is directly conveyed to the float body 14. The float body has a total length of 250 meters where 100 meters is above the sea water surface. This means that the power plant does not need optimization of its weight when it is constructed and built, to the same degree as for the previous techniques. The vertical forces that can arise on variation of the airflow, for example, will quickly be absorbed by the float body 14, which is rotating in the sea water and which will effectively stabilize the aggregate 10. It is partly stabilised because of the conservation of the angular momentum, which means that when a relatively heavy object is rotating, the object resists from changes of its orientation. It is also stabilised by the inertia of the water, which means that the aggregate 10 will keep on rotating in the same direction, so it will not consume energy by moving around in the water. The energy that is absorbed by the part 13, the wind rotor, is directly conveyed to the float body 14 and is stored there as kinetic energy. The float body 14 is now using sea water, which is pumped in by water pumps, for example, and fills the cavities that is more rotationally decentralised in float body 14.

In this case the sea water fills up the torus shaped ring 28 with a diameter of 230 meters, comprised by the float body 14, and positioned 30 meters above sea water surface. It means that the mass which is the base for the kinetic energy storage increases or is moved to a position further away from the central axis of rotation and that a larger amount of energy can be stored. The part 13 increases the energy which is stored in aggregate 10 and the float body 14 is rotating with high speed and has filled all its cavities and moved its mass, which in this case consists of sea water. When the torus ring 28 is completely full with seawater and the rotational frequency is 0.08, the aggregate 10 can store about 5 MWh. It means that a large amount of energy is stored in the float body 14 with the torus ring 28.

When the wind and the motions of the air ceases the part 13 will stop absorbing energy and conveying it to the float body 14. The float body 14 will, however, still rotate with high speed and keep storing energy in form of a rotating motion. In this example the wind turbine and wings absorbing the energy is positioned by wires that also hold the torus ring 28. In this example these wings can be moved from a less rotationally centralised and a more rotationally centralised position. This can be used to change the energy storage capacity but also to change the energy absorption of the turbine. It can also be used to alter friction losses. In a case when the wind or water velocity has decreased, it could be better to position the blades in a more rotationally centralised position. The velocity and friction losses could with this technique be lowered.

A need of energy at the electricity grid may arise and the conversion means 16, which in this example consist of a generator, will start to generate electricity into the grid. The second part 17 extends through the float body 14 and is connected to the conversion means 16 by means of a shaft. It is also connected with anchorage means 15 to the base 18. Hereby the conversion means 16 is provided with a non-rotatable point, which it uses when it needs to convert the rotation and the kinetic energy to electricity. Now the float body 14 has exhausted its kinetic energy, but in order to maintain the speed of rotation the float body 14 will, in this case, use the possibility to pump or open valves so that mass can be moved from a less rotationally centralised cavity to a more rotationally centralised cavity. In this way the float body 14 may be drained of its energy but still keep the same rotational velocity. When enough energy has been removed from the float body 14, the rotation will slow down and eventually the aggregate 10 will stand still without rotating.

The wind may be zero locally where the aggregate 10 has been installed, while it blows in other places in the electricity grid, which is interconnected with aggregate 10. These places may be provided with wind-power stations, and if the need of electricity on the grid is low, the conversion means 16 will convert electricity from these wind-power stations in different places into kinetic energy and store the energy in the float body 14. The float body 14 will start rotating faster because of the energy that is supplied from the grid, and it will start to fill up the cavities with sea water again. The stored energy can later be re-supplied into the grid, to be used again, when the need arises. In one example, where the float body 14 is built very large or where also the surrounding water is used for energy storing in a large scale, the aggregate 10 can become a very large energy reservoir.

By pumping sea water between different locations in the aggregate, for example, the aggregate 10 may rise or sink in relation to the liquid 12, which could be useful during the installation or in severe weather. At extreme weather conditions, the aggregate 10 could be located below the surface for example. In water with large waves, the aggregate 10 may be raised.

The aggregate 10 according to the present invention could also comprise various sensors, control systems and communication systems. These may be incorporated to determine wave height, wave speed and more. It is also possible that aggregate 10, in severe weather for example, could be lowered, which means moved to a location where the aggregate is protected when factors such as liquid velocities, gas velocities or wave heights exceed a predetermined value. Since wave loads are highest at the water surface, is it possible to significantly reduce the pressure on the aggregate 10. It should also be mentioned that aggregate 10 could be equipped with ladders, work cabins, construction sites for ships, and helicopters or other types of transportation vehicles. It is also considered to equip the aggregate 10 with surface lots, floats, weights or other types of constructions which provide buoyancy. One can also imagine that aggregate 10 is equipped with special coatings or material to reduce fouling, friction or other effects. It is also considered to attach anchorage means 15 in a fundament or a buoy.

Figure 4:
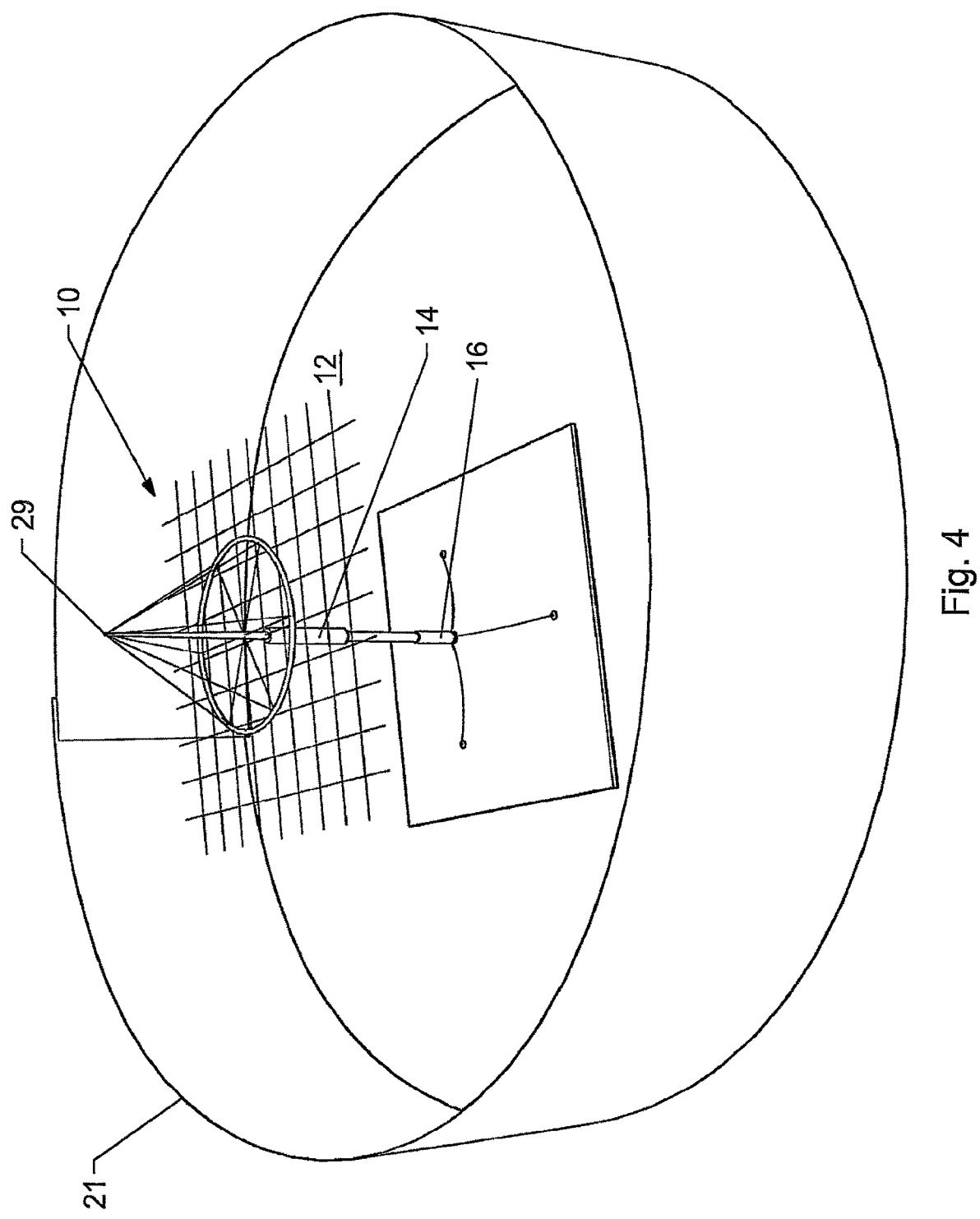
FIG. 4 is a schematic, perspective view of the embodiment of the invention according to FIG. 1, where a separating wall has been raised around the aggregate.

In the example where the float body 14 is arranged to provide a large surface area, by fins, blades etc., and create local, surrounding currents in a liquid, it can also be useful to control or restrict the expansion or directions of these currents by means of a wall 21 that extends for example from the bottom of the sea to the surface, as shown in FIG. 4. Another possibility is to use natural formations or natural currents to enhance or defend different impacts. It may also be considered that the liquid is located in a container at land and that the aggregate 10 is located in this container.

In some embodiments it may be preferred to restrict the surrounding water with screens or walls 21. The screens or walls 21 in FIG. 4 could have weights at the bottom so that they have contact with the base 18 at the bottom and they may be given buoyancy in the upper edge with for example a floating buoy, to keep the screen or wall 21 in an upright position. Hereby it could be prevented that possible ocean currents would carry off rotational energy that is stored in the surrounding waters. This would make it possible to store very large amounts of energy in a cost efficient way in something that can be compared to local currents.

Figure 5:
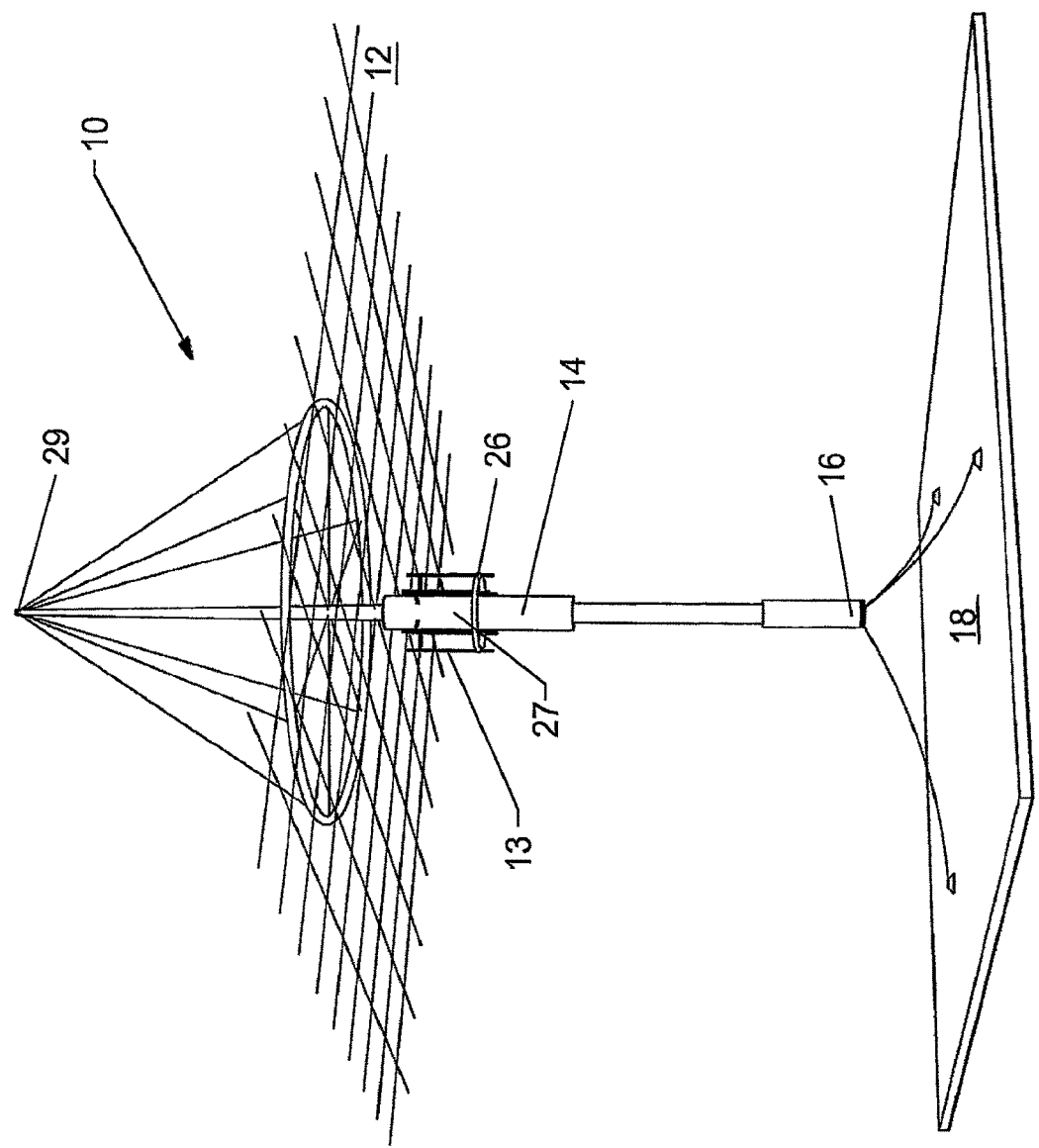
FIG. 5 shows a schematic, perspective view of a fourth embodiment of the aggregate which stores energy in form of motions and absorbs motions of water as a vertical axis power plant.

The part 13 could be designed in many ways for example as a horizontal axis power plant to absorb the energy from motions in a fluid, such as air. In one example, with a horizontal axis power plant which absorbs energy in the motion of a fluid, it may be preferred if part 13 is provided with a ring 26 that surrounds the area 27 that absorbs the energy, such as shown in FIG. 5. It means, in this example, that a torus shaped ring is situated at the outer ends of the rotor.

In FIG. 5 the part 13 is comprised by a vertical axis water-power station, which in this embodiment absorbs energy from the liquid 12. The energy is stored in the float body 14 as kinetic energy in form of rotation. The float body 14 is allowed to rotate from time to time, even if said part 13 rotates with a lower speed or has completely stalled in relation to said float body 14. In this embodiment, the float body 14 at least partially gives buoyancy to the aggregate 10 in the liquid 12.

Figure 6:
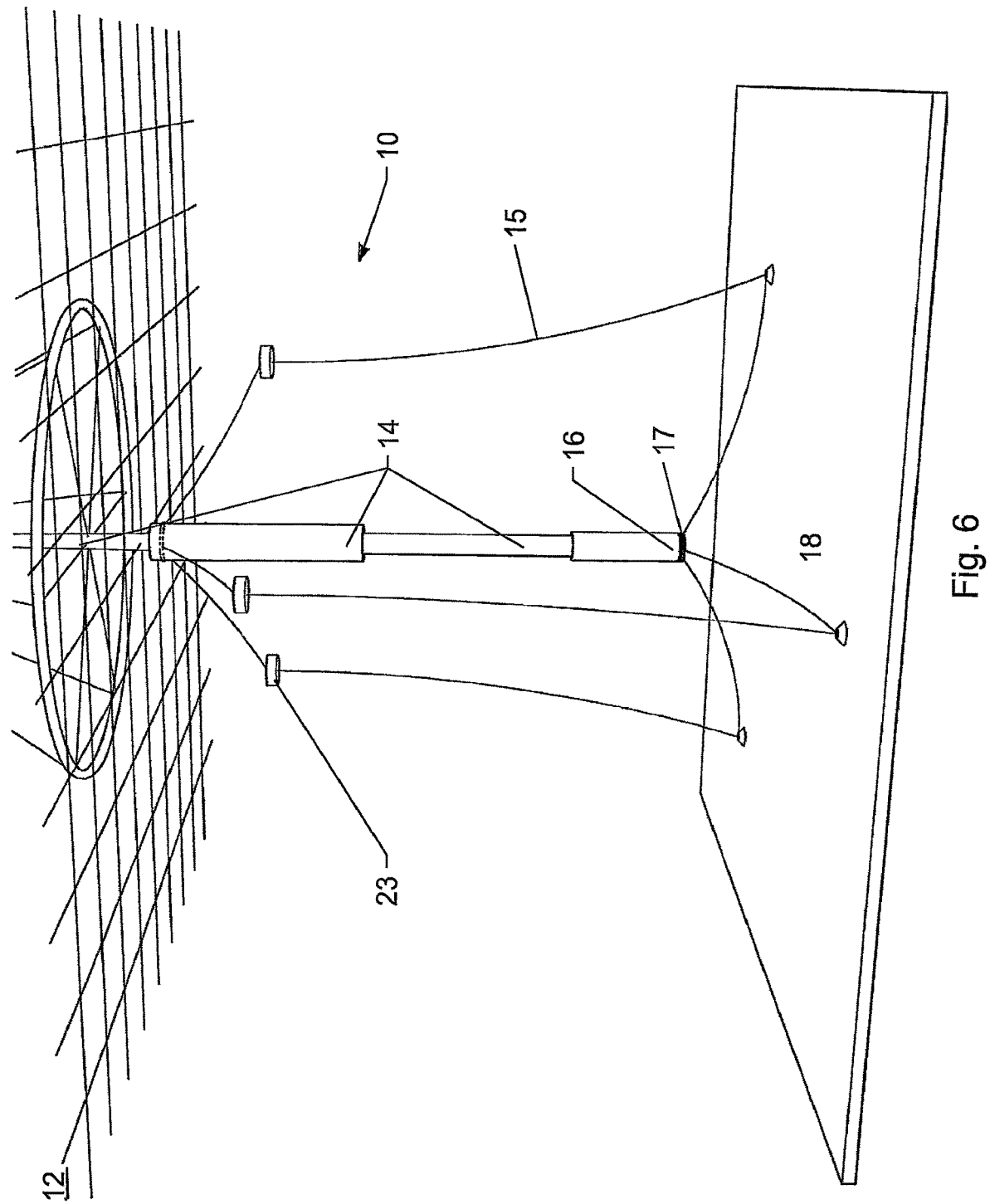
FIG. 6 is a schematic, perspective view of yet another embodiment of the invention showing an anchorage system with floating objects.

Floating objects 23 or other equipment is usable in anchorage means 15 as shown in FIG. 6. In FIG. 6 an example is shown, where the anchorage means 15 also connects to the float body 14 at a higher point. This could be a good way to get a higher attachment to the float body and to enhance the stability. At the same time it could be a good way to let the floating objects 23 give even more room for the anchorage system and aggregate 10 to move due to variations around its position.

Figure 7:
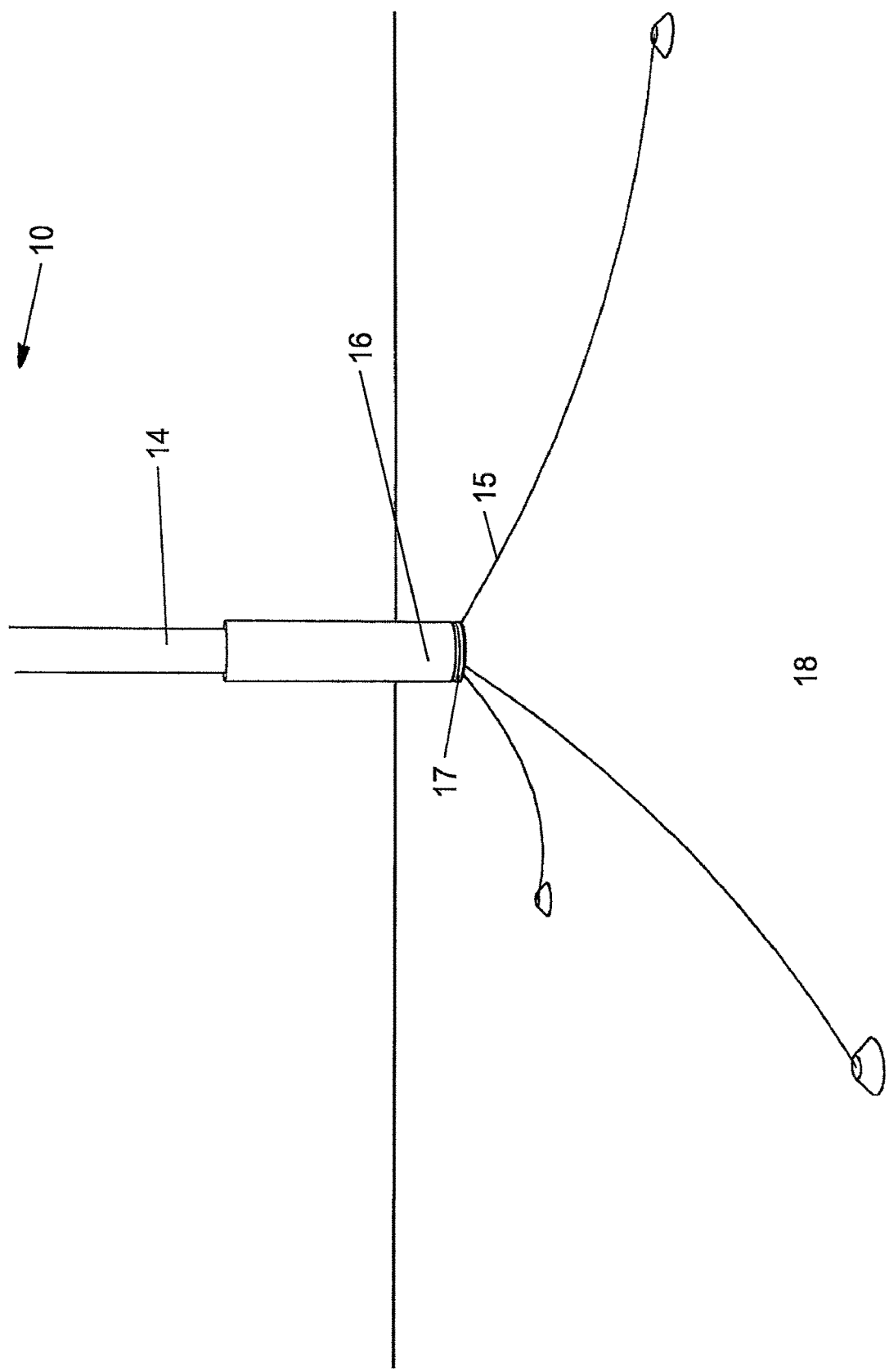
FIG. 7 shows a schematic, perspective view in detail of the lower parts of the float body in the embodiments according to FIGS. 1-6.

FIG. 7 shows a detail view of the float body 14, the conversion means 16, the second part 17 and the anchorage means 15 connecting the aggregate 10 to the base 18.

Figure 8:
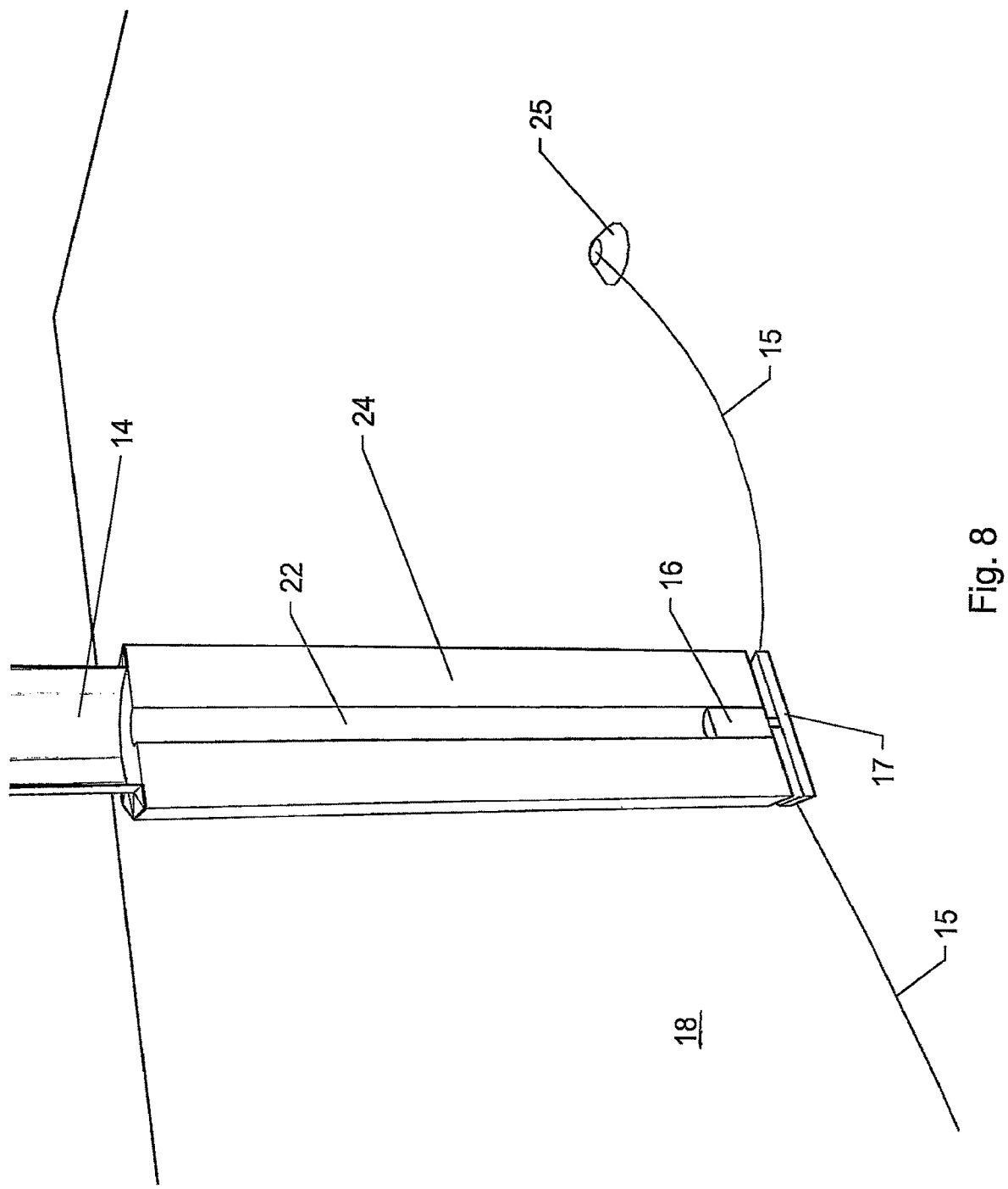
FIG. 8 shows a perspective view in cross-section of another embodiment of the lower parts of the aggregate.

FIG. 8 shows a cross section of the lower part of the aggregate 10 and an example of how the lower sections of the aggregate 10 could be built. The float body 14 contains a ballast weight 24 and a lift shaft 22 so that maintenance can be performed on the conversion means 16, in this case on the generator, generator axis, control systems etc. The second part 17 is shown interconnected to the generator 16 via an axis. The anchorage means 15 is showed connecting the aggregate 10 to the base 18 via an anchorage point 25. It should also be mentioned that maintenance on the aggregate 10 could be performed in a number of different ways. Examples of this could be by divers or by letting the aggregate 10 tilt and float on the water surface. Other ways are by bringing the aggregate 10 up on land, by moving the conversion means 16 inside of the aggregate 10 and upwards, or by moving 625 the conversion means 16 into the water and up to the surface for maintenance.

Alternative Embodiments

It should also be mentioned that in further different embodiments it may be handy to equip the aggregate 10 and the part 13 according to the embodiments shown and described above with other types of power plants, such as other types of blades, more blades or an extra set of blades which can work in a more stable way and therefore could be used to start the rotation of part 13. It is also possible to start the rotation by running a generator in reverse, as an electrical motor, or by adding other equipment. Examples of this can be a number of conversion means 16, which may work at different rotation speeds, or several conversion means which supply energy while extracting energy with another conversion means. It would make it possible to supply a relatively irregular electricity through a conversion means, for example generated from wave power, and extract a more regular electricity through another conversion means. In this way, the aggregate 10 and float body 14 with conversion means 16 could work as an energy and electrical converter.

It should be noted that the present invention is in no way limited to the above mentioned embodiments, but can be varied freely within the scope of the following claims. For example, the aggregate 10 could be equipped with fins, floating pontoons, weights or similar means to, for example, influence the movement qualities of the aggregate 10. Furthermore, the energy can be supplied to or transported from the float body 14 in a number of additional ways besides the ones shown in the description above, for example by pumping up water to a reservoir on a higher location. The energy can also be used to achieve reverse osmosis, to purify water from for example salt and/or polluted water. It is also considered to use the energy to produce hydrogen from the liquid 12, e.g. the sea water, and this hydrogen could be kept under pressure in the liquid 12 and be further transported by boats for example. It is also possible to store hydrogen in the second part 17 or in the float body 14.

The transmission of power could also to take place in magnetic fields, in which instance the components of the invention would be completely encapsulated. It is possible to imagine that the part 16 or a part thereof is included in the part 17, the part 13 and/or the float body 14. In such a case the part that generates the electric field would be included in one part 13, 14,17 and the part that induces the magnetic field would be included in another part 13, 14, 17. These parts would still be completely encapsulated.

The aggregate 10 can also include a number of parts 13, floating bodies 14 and conversion means 16 which will be interconnected to the second part 17. It should also be mentioned that the float body 14 can be produced from a stiff material but said float body 14 can also be produced from a flexible or inflatable material. It can be possible to fill the float body 14 with different types of gases or liquids with various densities to modify the buoyancy of float body 14. For example, helium gas could be used.

It should also be mentioned that the part 13, which absorbs the energy, could be produced from a stiff material, like the materials used in wind-power stations according to the prior art. But the part 13 could also be manufactured from a thin material, such as canvas. It is also possible to stretch canvas on sails or sailcloth to focus the motions through the part 13.

What is claimed is:

1. A floating wind energy harvesting apparatus for offshore installation, said wind energy harvesting apparatus comprising:
    an elongated wind turbine body extending along a longitudinal wind turbine body axis, said wind turbine body comprising a lower body portion to be below a water surface when the wind energy harvesting apparatus is in operation and an upper body portion to be above the water surface when the wind energy harvesting apparatus is in operation;
    wind turbine blades attached to the upper body portion for converting wind energy to rotation of the wind turbine body, including the lower body portion and the upper body portion, around the longitudinal wind turbine body axis;
    an energy converter attached to said wind turbine body for converting the rotation of said wind turbine body in relation to a non-rotatable part to another form of energy; and
    anchorage means connecting said non-rotatable part to at least one anchor point via at least one float body.

2. The floating wind energy harvesting apparatus according to claim 1, wherein said at least one float body is submerged in a body of water in which said wind energy harvesting apparatus is floating.

3. The floating wind energy harvesting apparatus according to claim 1, wherein said anchorage means connect said non-rotatable part to each anchor point in a plurality of anchor points via a corresponding float body in a plurality of float bodies.

4. The floating wind energy harvesting apparatus according to claim 1, wherein said at least one anchor point is arranged at a bottom of said body of water in which said wind energy harvesting apparatus is floating.

5. The floating wind energy harvesting apparatus according to claim 1, further comprising:
    at least a first cavity inside said wind turbine body and arranged within a first radial distance from said longitudinal wind turbine body axis; and
    at least a first pump for pumping water from said body of water in which said wind energy harvesting apparatus is floating to said first cavity, to thereby enable controlled raising or sinking of the floating wind energy harvesting apparatus.

6. The floating wind energy harvesting apparatus according to claim 5, wherein said first cavity is arranged in the lower body portion of said wind turbine body.

7. The floating wind energy harvesting apparatus according to claim 5, further comprising:

at least a second cavity arranged within a second radial distance, greater than said first radial distance, from said longitudinal wind turbine body axis; and a second pump for pumping water from said first cavity to said second cavity.

8. The floating wind energy harvesting apparatus according to claim 7, wherein said second cavity is arranged to be above the water surface when the wind energy harvesting apparatus is in operation, and to rotate together with said elongated wind turbine body.

9. The floating wind energy harvesting apparatus according to claim 8, wherein said second cavity is inside a torus shaped ring attached to the upper body portion of said elongated wind turbine body.

10. The floating wind energy harvesting apparatus according to claim 1, wherein the lower body portion of said elongated wind turbine body comprises a float body for keeping said wind energy harvesting apparatus floating.

11. The floating wind energy harvesting apparatus according to claim 10, wherein said float body comprises a cylindrical portion and a first conical portion above the cylindrical portion.

12. The floating wind energy harvesting apparatus according to claim 11, wherein said float body comprises a second conical portion below the cylindrical portion.

13. The floating wind energy harvesting apparatus according to claim 1, wherein the lower body portion of said elongated wind turbine body exhibits a longer extension along said longitudinal wind turbine body axis than the upper body portion of said elongated wind turbine body.

14. The floating wind energy harvesting apparatus according to claim 1, wherein the lower body portion further comprising a ballast weight.

15. The floating wind energy harvesting apparatus according to claim 14, wherein:

the floating wind energy harvesting apparatus further comprises at least a first cavity inside said wind turbine body and arranged within a first radial distance from said longitudinal wind turbine body axis; and said ballast weight is arranged below said first cavity.

* * * * *